MAGNETIC UNIVERSAL LOGICAL CIRCUIT

Original Filed Oct. 14, 1957 5 Sheets-Sheet 1

*INVENTOR*
JOHN A. KAUFFMANN
*BY* William V. Schelberg
AGENT

MAGNETIC UNIVERSAL LOGICAL CIRCUIT

Original Filed Oct. 14, 1957

United States Patent Office 3,226,699
Patented Dec. 28, 1965

3,226,699

MAGNETIC UNIVERSAL LOGICAL CIRCUIT

John A. Kauffmann, Poughkeepsie, N.Y., assignor to International Business Machines Corporation, New York, N.Y., a corporation of New York Continuation of abandoned application Ser. No. 689,827, Oct. 14, 1957. This application Aug. 29, 1961, Ser. No. 136,971
10 Claims. (Cl. 340—174)

This is a continuation of patent application S.N. 689,827 filed October 14, 1957, and now abanboned. This invention relates to electrical pulse transfer circuits and more particularly to pulse transfer circuits which are adapted to perform logical operations on pulses representative of binary digits.

Logical circuits are employed throughout accounting equipment and computers for widely different purposes and are variously known as gates, buffers, coincidence circuits and the like. This invention is directed to circuits of this general category employing magnetic elements and to a universal logical circuit which is capable of performing "transfer," "inversion," "equivalence," "if then," "not both," "inclusive or" and "exclusive or" function.

A transfer circuit may be defined as a circuit with one input terminal and one output terminal wherein a signal is delivered at the output terminal when a pulse is supplied to the input terminal, while an inversion circuit may be defined as a circuit with one input terminal and one output terminal at which a signal is delivered in the absence of a pulse to the input terminal. An equals circuit may be defined as a circuit with a plurality of input terminals and a single output terminal at which a signal is delivered when all or none of the input terminals receive a pulse, and the if then circuit, or conditional circuit, may be defined as a circuit with a plurality of input terminals and a single output terminal at which a signal is delivered in all instances except when and only when a single pulse is delivered to a desigated input terminal. A not both circuit may be defined as a circuit with two input terminals and a single output terminal at which a signal is delivered in all instances except when and only when a signal is delivered to both input terminals, which circuit is also known in the art as a negative and circuit. An inclusive or circuit may be defined as a circuit with a plurality of input terminals and a single output terminal at which a signal is delivered in all instances except when no input is delivered to any one of the input terminals, while an exclusive or circuit may be defined as a circuit with a plurality of input terminals and a single output terminal at which a signal is delivered in all instances except when no input pulse is delivered to any one of the input terminals and when input pulses are delivered to all the input terminals.

The trend, in todays computer research, is the replacement of vacuum tube circuitry with components capable of performing the functions described above which are more reliable, have longer life and are more economical. Magnetic cores are well adapted for this purpose and, in accordance with the present invention, are utilized to perform the difficult functions of logic necessary in computer steering.

Accordingly, it is an object of this invention to provide new and improved logical circuits which employ magnetic cores.

It is a further object of this invention to provide a magnetic core universal circuit which may be selectively utilized for the performance of various logical operations.

A still further object of this invention is to provide a new and improved arrangement of components to perform logical operations and adapted for employment with other magnetic core circuitry.

Another object of this invention is directed to new and imroved logical circuits in which a magnetic core is set and reset during each operating cycle to provide the transfer of information.

Other objects of this invention will be pointed out in the following description and claims and illustrated in the following drawings, which disclose, by way of example, the principle of the invention and the best mode, which has been contemplated, of applying that principle.

Figure 1:
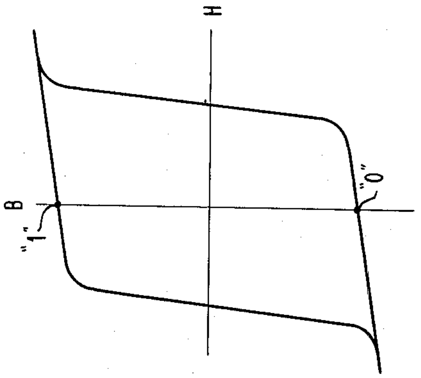
FIG. 1 is a representation of the hysteresis characteristic obtained for a rectangular magnetic material of the type employed.

Referring to FIG. 1, the curve illustrated comprises a plot of flux density versus applied field for a magnetic core having a substantially rectangular hysteresis characteristic. The opposite remanence conditions are arbitrarily designated as 0 and 1 in the figure. With a 0 stored, a pulse applied to a winding linking the core in proper sense causes the loop to be traversed and the remanence state 1 is attained when the pulse terminates. Such a pulse is hereinafter referred to as a write pulse. Similarly, the core is read out or returned to the 0 state in determining what information has been stored by applying a pulse in the reverse sense to the same winding, hereinafter referred to as a read pulse. Should a 1 have been stored, a large flux change occurs with a shift from 1 to 0 conditions with a corresponding voltage magnitude developed on an output winding. On the other hand, should a 0 have been stored, little flux change occurs and negligible signal is developed on the output windings. For reasons of clarity, when the core is read out or returned to the 0 state by applying a pulse in the reverse sense to a different winding linking the core, it will be referred to as a reset pulse.

A dot is shown adjacent one teminal of each of the windings illustrated in FIGS. 2, 3, 4, 5, 6, 7, 8 and 9 indicating its winding direction. A write pulse is a positive pulse which is directed into the undotted end of the winding terminal which tends to store a 1, while a read or reset pulse is a positive pulse directed into the dotted end of the winding terminal and tends to apply a negative field or store a 0.

The arrangements disclosed employ input and output coupling magnetic cores arranged intermediate to so called storage magnetic cores which store certain logical information and these arrangements are adapted to be interconnected with each other and with similar type circuitry through such coupling cores. Also employed in the circuits, hereinafter described, are so called inhibit coupling cores whose distinction resides in the fact that said inhibit cores are adapted to be set to the 1 state and reset to the 0 state in each cycle of operation. Further, the logic utilized is to allow the inhibit cores to repeatedly transfer information to the storage cores unless inhibited by the transfer of input information to the input cores. The function of the so called inhibit cores is more readily understood and explained in the description below.

The coupling cores may be fabricated of ferrite materials like the storage cores, however, it is not essential that these cores exhibit the rectangular hysteresis characteristic required of the storage or memory cores as these devices function as variable impedance elements in controlling the transfer of information pulses. As shown in the several figures, such interconnecting coupling cores, and others falling within this category are labeled $C_1$, $C_2$, $C_3$, $C_4$, $C_5$, $I_1$ and $I_2$ for clarity. Also shown are two storages cores $S_1$ and $S_2$. The core $S_1$ is adapted to deliver information received to the storage core $S_2$ through a coupling core $C_4$ wherein the core $S_2$ may comprise a storage core of another logical component.

Figure 2:
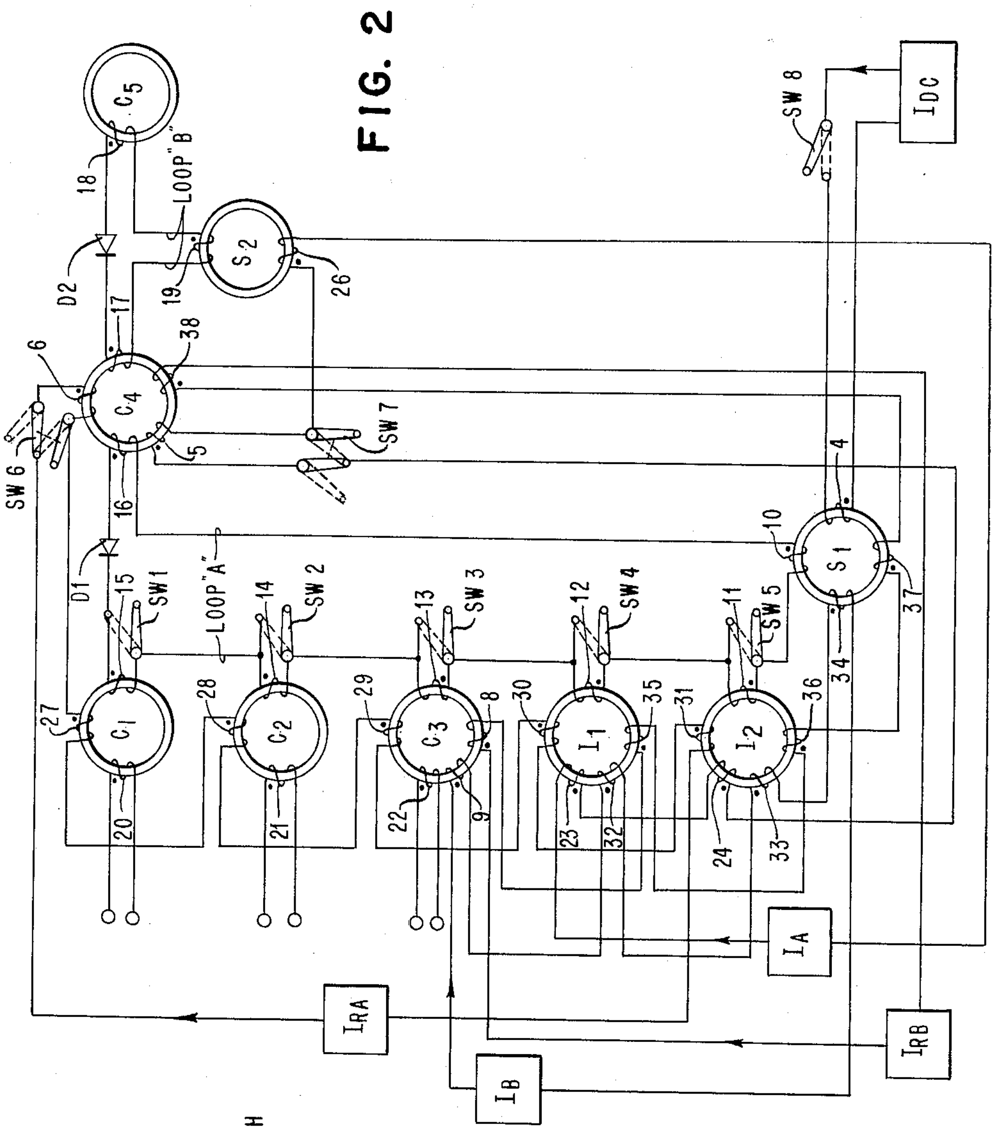
FIG. 2 is a circuit diagram of a universal magnetic core logical circuit according to one feature of this invention.

Referring to FIG. 2, the core $S_1$ is provided with an output winding 10 interconnected with an output winding 11 of core $I_2$ and a switch $SW_5$ which is connected in parallel to the winding 11, an output winding 12 of the core $I_1$ and a switch $SW_4$ which is connected in parallel to the winding 12, an output winding 13 on the core $C_3$ and a switch $SW_3$ which is connected in parallel to the winding 13, an output winding 14 on the core $C_2$ and a switch $SW_2$ which is connected in parallel to the winding 14, an output winding 15 on the core $C_1$ and a switch $SW_1$ which is connected in parallel to the winding 15 and an input winding 16 on the core $C_4$ through a diode $D_1$ which interconnection is hereinafter referred to as loop A. The core $C_4$ is further provided with an output winding 17 interconnected with an input winding 18 on the core $C_5$ through a diode $D_2$, and an input winding 19 on the core $S_2$, which interconnection will hereinafter be referred to as loop B.

The storage core $S_1$ is adapted to receive information pulses transferred to it through the cores $C_1$, $C_2$, $C_3$, $I_1$ and $I_2$, which information is in turn transferred from the core $S_1$ through the coupling core $C_4$ to the following logical stage. The storage core $S_2$ is representative of a storage core in such a following stage. Input signals are applied to the cores $C_1$, $C_2$ and $C_3$ by means of input windings 20, 21 and 22, respectively. The cores $I_1$, $I_2$, $S_2$ and $C_4$ are energized from a clock pulse source $I_A$ and the cores $C_1$, $C_2$, $C_3$, $I_1$, $I_2$ and $C_4$ are energized by a clock pulse source $I_{RA}$. The cores $I_1$, $I_2$ and $S_1$ are energized from a clock pulse source $I_B$ while the cores $I_1$, $I_2$, and $S_1$, $C_3$ and $C_4$ are energized by a clock pulse source $I_{RB}$ The core $S_1$ is further energized by a D.C. source designated $I_{D.C.}$ upon operation of a switch $SW_8$. A winding 23 is provided on the core $I_1$, a winding 24 on the core $I_2$, a winding 26 on the core $S_2$ and a winding 5 on the core $C_4$ which windings are series connected with the clock pulse source $I_A$. A winding 27 is provided on the core $C_1$, a winding 28 on the core $C_2$, a winding 29 on the core $C_3$, a winding 30 on the core $I_1$, a winding 31 on the core $I_2$, and a winding 6 on the core $C_4$ which windings are series connected to the clock pulse source $I_{RA}$. Similarly, a winding 9 is provided on the core $C_3$, a winding 32 on the core $I_1$, a winding 33 on the core $I_2$ and a winding 34 on the core $S_1$ which windings are series connected to the clock pulse source $I_B$. A winding 8 is provided on the core $C_3$, a winding 35 on the core $I_1$, a winding 36 on the core $I_2$, a winding 37 on the core $S_1$ and a winding 38 on the core $C_4$ which windings are series connected to the clock pulse source $I_{RB}$. A winding 4 is further provided on the core $S_1$ and is series connected with the D.C. source $I_{D.C.}$ upon operation of the switch $SW_8$. A switch $SW_6$ is further provided with the winding 6 on the core $C_4$ and a switch $SW_7$ is provided with the winding 5 on the core $C_4$.

Figure 10:
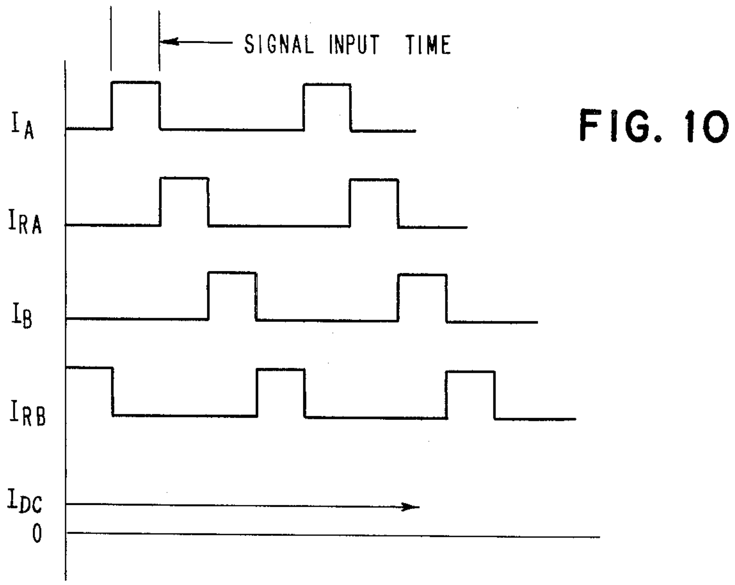
FIG. 10 illustrates the relative timing of current pulses which are required for operating the circuits of FIGS. 2, 3, 4, 5, 6, 7, 8 and 9.

The sequence of pulses provided by the several clock pulse sources described above is indicated in FIG. 10 and the time of appearance of a pulse from one of the sources is referred to as the pulse time of that source in the following description. It should be further understood that the term input as used hereafter, designates a positive pulse which is directed to the undotted end of an input winding, and which occurs in the interval at which the $I_A$ clock pulse appears or at $I_A$ pulse time.

To explain the operation of the circuits disclosed, consider first, in all circuits described, as an initial condition, that all the cores shown are at a zero state or at the lower remanence condition 0 shown in FIG. 1.

Figure 3:
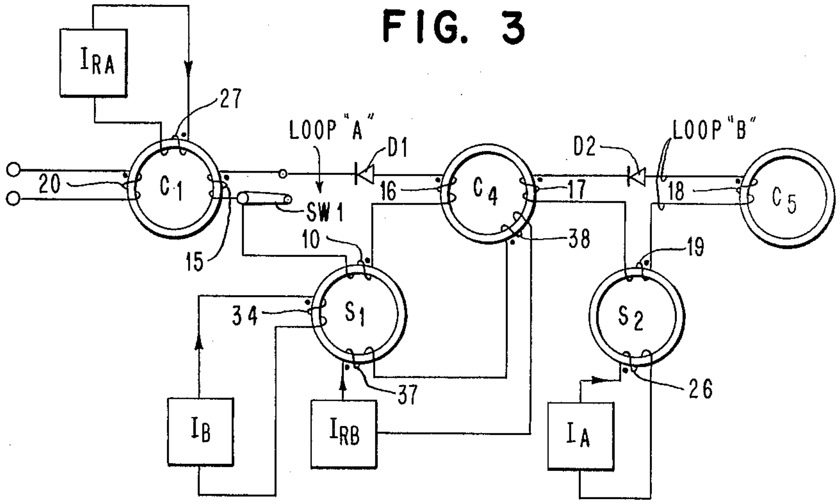
FIG. 3 is an equivalent circuit diagram illustrating the transfer circuit of FIG. 2.

In the universal circuit shown in FIG. 2, with switches $SW_2$, $SW_3$, $SW_4$, $SW_5$, $SW_6$ and $SW_7$ operated, certain of the cores are rendered ineffectual and the operating cores of the circuit thus formed is as shown in FIG. 3 which circuit is adapted to perform the function of transfer and will now be referred to for sake of clarity. With an absence of an input to the core $C_1$ at $I_A$ pulse time, the $I_A$ clock pulse source delivers a reset signal into the winding 26 on the core $S_2$, which has negligible effect upon the core since it is already in the 0 state. After the $I_A$ clock pulse subsides, the $I_{RA}$ clock pulse source directs a reset signal into the winding 27 on the core $C_1$ which similarly has no effect on the core $C_1$ other than driving it further into saturation in the 0 direction of magnetization. The clock pulse source $I_B$ subsequently directs a reset signal into the winding 34 on the core $S_1$ which similarly has no effect. Thereafter, when the $I_{RB}$ clock pulse source operates and directs a reset signal into the windings 37 and 38 on the cores $S_1$ and $C_4$, respectively, the circuit is uneffected.

Assume that an input signal is available and is directed into the input winding 20 on the core $C_1$. This input signal then switches the core $C_1$ from the 0 to the 1 state and in so doing causes a flux change which induces a voltage on the output winding 15 on the core $C_1$ with the undotted end positive causing a counterclockwise current flow in the loop A. This counterclockwise current flow is directed into the undotted end of the windings 10 and 16 on the cores $S_1$ and $C_4$, respectively, and starts switching the core $S_1$ from the 0 to the 1 state due to the fact that a greater number of turns is provided in the winding 10 as compared with the turns of the winding 16. At the termination of the input pulse, the cores $C_1$ and $S_1$ are left in the 1 remanence state. The $I_{RA}$ clock pulse source directs a reset signal into the winding 27 on the core $C_1$ which switches this core from the 1 to the 0 state. Resetting the core $C_1$ induces a voltage on the output winding 15 with the dotted end positive tending to cause a clockwise current flow in the loop A which is blocked and its energy dissipated by the high back resistance of the diode $D_1$. Subsequently, the $I_B$ clock pulse source directs a reset signal into the winding 34 on the core $S_1$, which resets the core to the 0 state and thereby induces a voltage on the output winding 10 with the dotted end positive causing a counterclockwise current flow in the loop A. This counterclockwise current flow tends to write the core $C_4$ and read the core $C_1$. The core $C_1$ is already in the 0 state and negligible voltage drop appears across the winding 15, while the core $C_4$ switches from the 0 to the 1 state. Switching the core $C_4$ to the 1 state induces a voltage on the output winding 17 with the undotted end positive causing a counterclockwise current flow in the loop B which tends to write the cores $S_2$ and $C_5$ but preferentially switches the core $S_2$ to the 1 state. At the termination of the $I_B$ clock pulse, the core $S_1$ is left in the 0 remanence state, while the cores $C_4$ and $S_2$ are left in the 1 remanence state. The $I_{RB}$ clock pulse source next directs a reset signal into the windings 37 and 38 of the cores $S_1$ and $C_4$, respectively, which resets the cores $C_4$ from the 1 to the 0 state. In resetting the core $C_4$, a voltage is induced on the winding 16 with the dotted end positive causing a counterclockwise current flow in loop A, while similarly inducing a voltage in the winding 17 with the dotted end positive tending to cause a clockwise current flow in loop B. This counterclockwise current flow in loop A tends to read the core $C_1$, but has no effect since the core $C_1$ is already in the zero state, and tends to write the core $S_1$, which is held in the 0 state by virtue of the $I_{RB}$ drive. The clockwise current flow in loop B is blocked and dissipated by the diode $D_2$. Thus the function of transfer has been accomplished, leaving all the cores associated with the loop A in the 0 remanence state readying the circuit for the next cycle of operation. As the next cycle of operation begins, the $I_A$ pulse, through winding 26, causes storage core $S_2$ to reset. Resetting of core $S_2$ induces a voltage in winding 19 causing a counterclockwise current flow in loop B which writes the output coupling core $C_5$. Core $C_5$ may function as an input coupling core, similar to $C_1$, in a following logical stage of a larger system. Core $C_5$ will thus be provided with appropriate reset and output windings (not shown).

Figure 4:
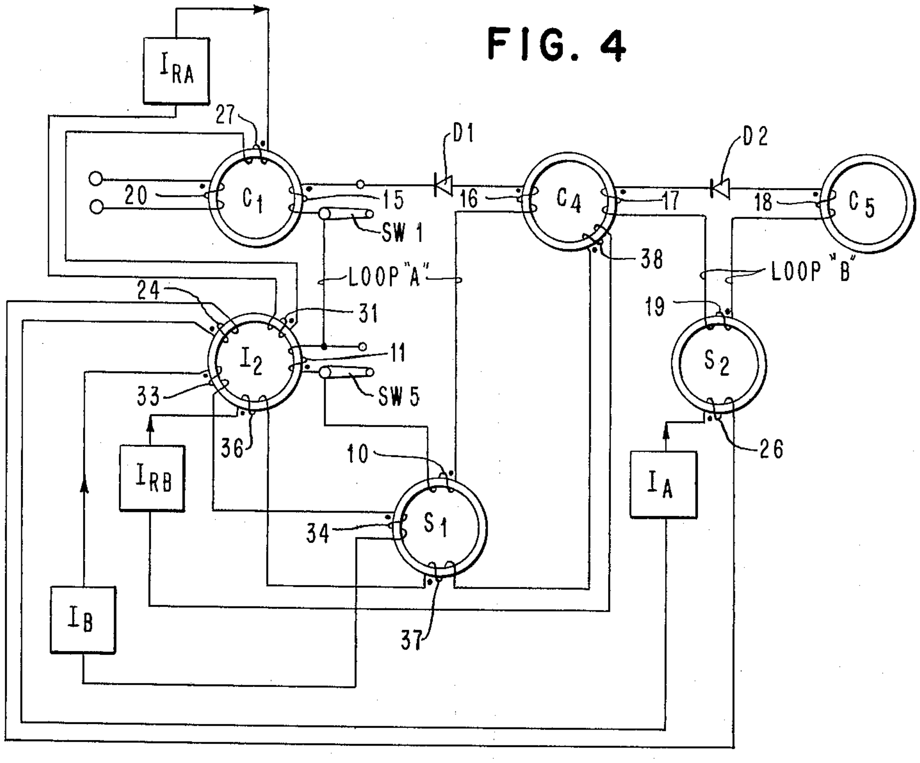
FIG. 4 is another equivalent circuit diagram illustrating the inverter circuit of FIG. 2.

In FIG. 2, with the switches $SW_2$, $SW_3$, $SW_4$, $SW_6$ and $SW_7$ operated, the circuit formed including only those cores that are operative is as shown in FIG. 4 which will now be referred to. This circuit is adapted to perform the function of inversion. Under the condition that no input is applied to the circuit, the clock pulse source $I_A$ directs a write signal into the winding 24 on the core $I_2$ which switches the core from the 0 to the 1 state, and in so doing induces a voltage on the output winding 11 with the undotted end positive which tends to cause a clockwise current to flow in the loop A. This clockwise current flow in loop A is blocked and dissipated by the diode $D_1$. Subsequently, the $I_{RA}$ clock pulse source directs a reset signal into the windings 27 and 31 on the cores $C_1$ and $I_2$ respectively, which tends to reset the cores. Since the core $C_1$ is already in the zero state, it is uneffected, while the core $I_2$ is reset to the 0 state and in so doing induces a voltage on the output winding 11 with the dotted end positive which causes a counterclockwise current flow in loop A. This counterclockwise current flow switches the core $S_1$ to the 1 state. The $I_B$ clock pulse source subsequently directs a reset signal into the windings 34 and 33 of the cores $S_1$ and $I_2$, respectively, which does not effect the core $I_2$ since it is already in the 0 state but does reset the core $S_1$ from the 1 to the 0 state and in so doing induces a voltage on the output winding 10 with the dotted end positive which causes a counterclockwise current flow in the loop A. This counterclockwise current flow tends to write the cores $C_4$ and $I_2$ while tending to read the core $C_1$. Since $C_1$ is already in the 0 state, and the core $I_2$ is held in the 0 state, the core $C_4$ is switched to the one state. The core $C_4$ in switching induces a voltage on the output winding 17 with the undotted end positive causing a counterclockwise current flow in the loop B which directs a write pulse into the winding 19 on the core $S_2$ and switches the core from the 0 to the 1 state.

At the termination of the $I_B$ clock pulse, the core $S_1$ is left in the 0 remanence state, while the cores $C_4$ and $S_2$ are left in the 1 remanence state. Next, the $I_{RB}$ clock pulse source directs a reset signal into the windings 36, 37 and 38 on the cores $I_2$, $S_1$ and $C_4$, respectively, which does not effect the cores $I_2$ and $S_1$, but resets the core $C_4$ to the 0 state. Switching the core $C_4$ to the 0 state induces a voltage on the windings 16 and 17 with their dotted ends positive causing a counterclockwise current flow in loop A and tending to cause a clockwise current flow in loop B. The clockwise current flow in loop B is blocked and dissipated by the diode $D_2$, while the counterclockwise current in loop A tends to read the core $C_1$ and write the cores $I_2$ and $S_1$. Since the core $C_1$ is already in the 0 state, it is uneffected, while the cores $I_2$ and $S_1$ are held in the 0 state by their $I_{RB}$ drives. Thus information has been transferred when no input is available to the circuit, and all the cores associated with the loop A are left in their 0 remanence state readying the circuit for the next cycle of operation. At the beginning of the next cycle of operation, the $I_A$ pulse resets $S_2$ and causes $C_5$ to be written as previously described in connection wtih FIG. 3.

Assume now that an input is available into the winding 20 on the core $C_1$ which switches the core to the 1 state. The core $C_1$ in switching, induces a voltage on the output winding 15 with the undotted end positive. At the same time the core $I_2$ is switched to the 1 state, by virtue of the $I_A$ clock pulse source which applies a write signal into the winding 24, and in so doing induces a voltage across the output winding 11 with the undotted end positive. The algebraic sum of the induced voltage is effectively zero, and negligible currrent flows in the loop A. At the termination of the $I_A$ clock pulse and input pulse, the cores $C_1$ and $I_2$ are left in the 1 remanence state. Next, the $I_{RA}$ clock pulse source directs a reset signal into the windings 27 and 31 of the cores $C_1$ and $I_2$ which switches the cores from the 1 to the 0 state. Switching the cores $C_1$ and $I_2$ induces a voltage on the output windings 15 and 11, respectively, with their dotted end positive. The algebraic sum of the induced voltage is effectively zero, and thus negligible current flows in loop A. The $I_B$ clock pulse source subsequently directs a reset signal into the windings 33 and 34 on the cores $I_2$ and $S_1$, respectively, which has negligible effect since both cores are already in the 0 state. The $I_{RB}$ clock pulse source directs a reset current pulse into the windings 36, 37 and 38 on the cores $I_2$, $S_1$ and $C_4$, respectively, which again has no effect since all cores were previously in the 0 state. Thus with an input applied to the circuit, information is not transferred and the function of inversion is realized.

Figure 5:
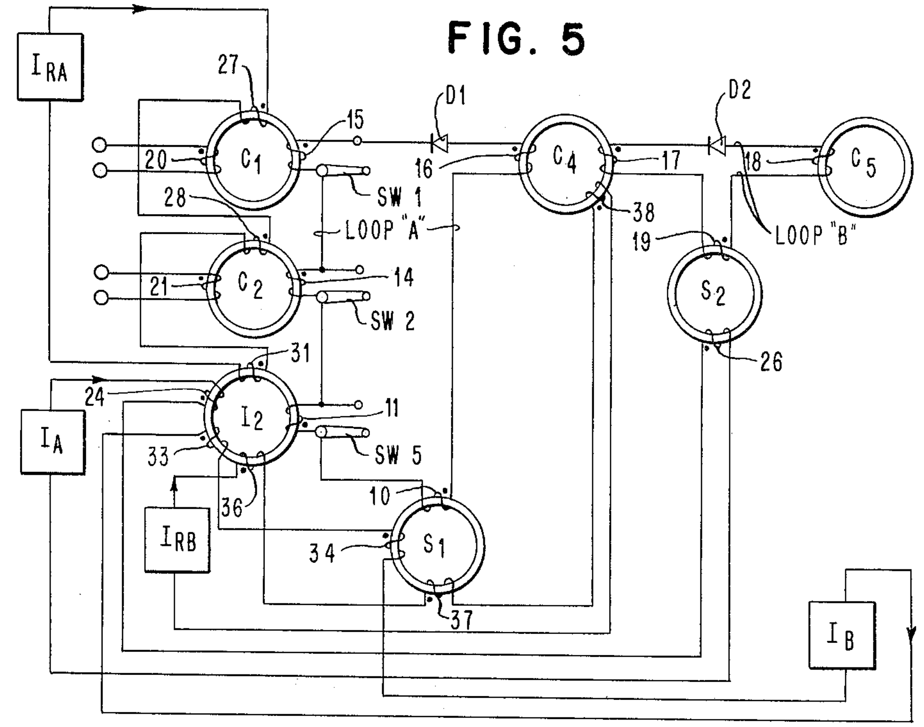
FIG. 5 is still another equivalent circuit diagram illustrating the equivalence circuit of the FIG. 2.

In the universal circuit shown in FIG. 2 with the switches $SW_3$, $SW_4$, $SW_6$ and $SW_7$ operated, the circuit formed is as shown in FIG. 5 and is adapted to perform the logical function of "equivalence."

Referring to FIG. 5, assume an absence of inputs. Initially, the $I_A$ clock pulse source directs a signal into the windings 24 and 26 on the cores $I_2$ and $S_2$, respectively, which signal tends to write the core $I_2$ and reset the core $S_2$. Since $S_2$ is already in the 0 state, it is uneffected, while the core $I_2$ is switched from the 0 to the 1 state and in so doing induces a voltage on the output winding 11 with the undotted end positive. This induced voltage tends to cause a clockwise current flow in loop A, which is blocked and dissipated by the diode $D_1$. The $I_{RA}$ clock pulse source next directs a reset signal into the windings 27, 28 and 31 on the cores $C_1$, $C_2$ and $I_2$, respectively, which does not effect the cores $C_1$ or $C_2$ but does switch the core $I_2$ from the 1 to the 0 state, and in so doing induces a voltage on the output winding 11 with the dotted end positive. This induced voltage causes a counterclockwise current flow in loop A which directs a write signal into the winding 10 on the core $S_1$ and switches the core $S_1$ from the 0 to the 1 state. The $I_B$ clock pulse source now directs a reset signal into the windings 33 and 34 on the cores $I_2$ and $S_1$, respectively, which does not effect the core $I_2$ but does switch the core $S_1$ from the 1 to the 0 state. The core $S_1$ in switching induces a voltage on the output winding 10 with the dotted end positive causing a counterclockwise current flow in loop A which tends to write the core $C_4$, read the cores $C_1$ and $C_2$ and write the core $I_2$. The cores $C_1$ and $C_2$ are uneffected, while the core $I_2$ is held in the zero state by virtue of the $I_B$ drive. The core $C_4$, however, is fully switched to the 1 state and in so doing induces a voltage on the output winding 17 with the undotted end positive causing a counterclockwise current flow in loop B. This current flow in loop B directs a write signal into the winding 19 on the core $S_2$ and therefore switches it to the 1 state. At the termination of the $I_B$ clock pulse, the core $S_1$ is left in the 0 remanence state, while the cores $C_4$ and $S_2$ are left in the 1 remanence state. Subsequently, the $I_{RB}$ clock pulse source applies a reset signal into the windings 36, 37 and 38 on the cores $I_2$, $S_1$ and $C_4$, respectively. The cores $I_2$ and $S_1$ are uneffected, while the core $C_4$ switches from the 1 to the 0 state. The core $C_4$ in switching induces a voltage on the windings 16 and 17 with the dotted end positive tending to cause a clockwise current flow in loop B, which is blocked and dissipated by the diode $D_2$, and causing a counterclockwise current flow in loop A which tends to read the cores $C_1$ and $C_2$, while tending to write the cores $I_2$ and $S_1$. The cores $C_1$ and $C_2$ are uneffected, while the cores $I_2$ and $S_1$ are held in the 0 state by virtue of their $I_{RB}$ drives. Since there was an initial equivalence of input signals; namely, zero's, a signal was delivered at the output terminals. As the next cycle of operation begins, the $I_A$ pulse, through winding 26, causes storage core $S_2$ to reset. Resetting of core $S_2$ induces a voltage in winding 19 causing a counterclockwise current flow in loop B which writes the output coupling core $C_5$. Core $C_5$ may function as an input coupling core, similar to $C_1$, in a following logical stage of a larger system. Core $C_5$ will thus be provided with appropriate reset and output windings (not shown).

Assume that an input pulse is now available which is directed into the winding 21 on the core $C_2$. The core $C_2$ then switches from the 0 to the 1 state which induces a voltage on the output winding 14 with the undotted end positive. At the same time, the $I_A$ clock pulse source directs a write signal into the winding 31 on the core $I_2$ which causes the core to switch from the 0 to the 1 state to induce a voltage on the output winding 11 with the undotted end positive. The algebraic sum of the induced voltages is effectively zero and negligible current flows in loop A. Subsequently, the $I_{RA}$ clock pulse source directs a reset signal into the windings 27, 28 and 31 on the cores $C_1$, $C_2$ and $I_2$, respectively, which tends to reset the cores to the 0 state. The core $C_1$ is uneffected since it is already in the 0 state, while the cores $C_2$ and $I_2$ are switched from the 1 to the 0 state to induce a voltage on the output windings 14 and 11, respectively, with the dotted end positive. Again, the sum of the induced voltages is effectively zero and negligible current flows in loop A. Since the core $S_1$ is left in the 0 remanence state at the termination of the input, the $I_A$, and $I_{RA}$ clock pulses, from the discussion above, it becomes apparent that information will not be transferred to the core $S_2$ via the output winding 17 by the subsequent application of the $I_B$ and $I_{RB}$ clock pulses. Thus for inequality of inputs; namely, one core 0 and the other 1, there is no signal delivered at the output terminals.

It is seen that if an input were available into the winding 20 of the core $C_1$, the same result as described above would occur, in that no signal would be delivered at the output terminals.

Assume that an input is available into both the windings 20 and 21 on the cores $C_1$ and $C_2$ to switch both cores from the 0 to the 1 state and in so doing induce a voltage on the output windings 15 and 14, respectively, with the undotted end positive. At the same time, due to the application of a signal from the $I_A$ clock pulse source directed into the winding 24 of the core $I_2$, a voltage is induced on the winding 11 on the core $I_2$ with the undotted end positive. The algebraic sum of the induced voltages is such as to cause a counterclockwise current flow in the loop A, which is directed into the undotted end of the winding 10 of the core $S_1$, to switch the core $S_1$ from the 0 to the 1 state. At the termination of the $I_A$ clock pulse, the cores $C_1$, $C_2$, $I_2$ and $S_1$ are left in their 1 remanence state and subsequently, the $I_{RA}$ clock pulse source directs a reset signal into the windings 27, 28 and 31 on the cores $C_1$, $C_2$, $I_2$, respectively. The cores $C_1$, $C_2$ and $I_2$ are reset to the 0 state, and in so doing induce a voltage on their output windings with their dotted end positive. The algebraic sum of the induced voltages is such as to tend to cause a clockwise current flow, which is blocked and dissipated by the diode $D_1$. Upon termination of the $I_{RA}$ clock pulse, the $I_B$ clock pulse source directs a reset signal into the windings 33 and 34 on the cores $I_2$ and $S_1$, respectively. This reset signal switches the core $S_1$ to the 0 state and in so doing induces a voltage on the output winding 10 with the dotted end positive, causing a counterclockwise current flow in loop A. This counterclockwise current tends to write the core $C_4$, read the cores $C_1$ and $C_2$, and write the core $I_2$. Since $C_1$ and $C_2$ are already in the 0 state, and the core $I_2$ is held in the 0 state by virtue of the $I_B$ drive, the core $C_4$ switches from the 0 to the 1 state to induce a voltage on the output winding 17 with the undotted end positive causing a counterclockwise current flow in loop B which writes the core $S_2$. At the termination of the $I_B$ clock pulse, the core $S_1$ is left in the 0 remanence state with the cores $C_4$ and $S_2$ in the 1 remanence state. Now, the $I_{RB}$ clock pulse source directs a reset signal into the windings 36, 37 and 38 on the cores $I_2$, $S_1$ and $C_4$, respectively, which resets the core $C_4$ to the 0 state to induce a voltage on the windings 16 and 17 with the dotted end positive tending to cause a clockwise current flow in loop B, which is blocked and dissipated by the diode $D_2$, and a counterclockwise current flow in loop A. This current in loop A has no effect since the cores $C_1$ and $C_2$ were previously in the 0 remanence state and the cores $I_2$ and $S_1$ are held in the 0 state by their $I_{RB}$ drives. The function of equivalence is therefore met since with two inputs, or with no inputs, a signal was delivered at the output terminals of the circuit.

Figure 6:
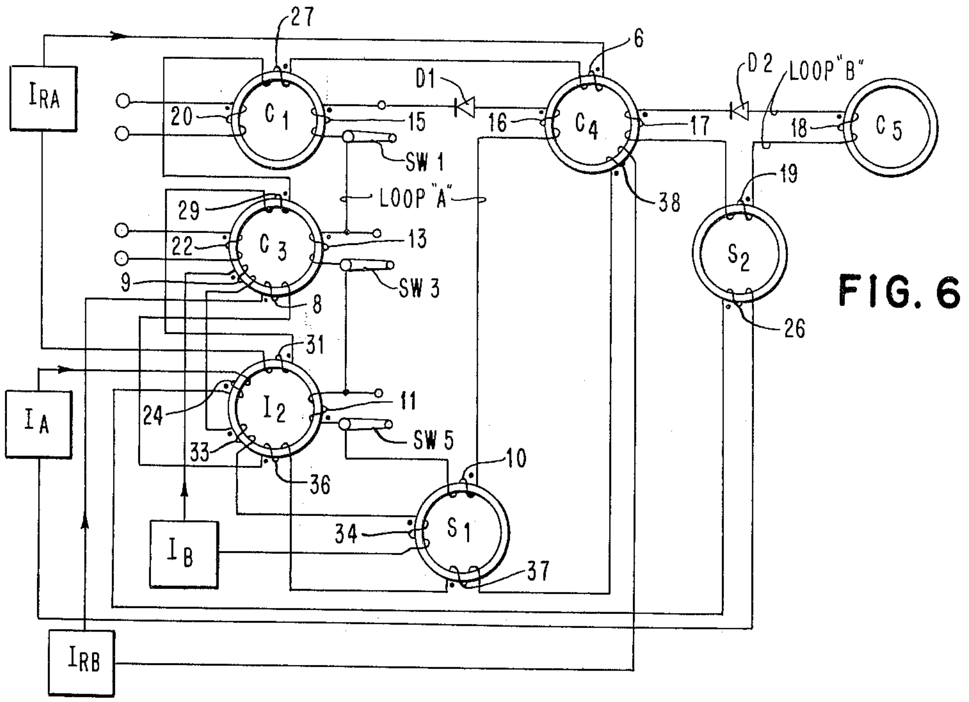
FIG. 6 is yet another equivalent circuit diagram illustrating the if then circuit of FIG. 2.

In the universal circuit shown in FIG. 2, with the switches $SW_2$, $SW_4$ and $SW_7$ operated, the effective circuit formed is as shown in FIG. 6 and is adapted to perform the logical function if then.

Referring to FIG. 6, with an absence of inputs initially, the $I_A$ clock pulse source directs a write signal into the winding 24 on the core $I_2$ to switch it from the 0 to the 1 state which induces a voltage on the output winding 11 with the undotted end positive. This induced voltage tends to cause a clockwise current flow in loop A which is blocked and dissipated by the diode $D_1$. Next the $I_{RA}$ clock pulse source directs a reset signal into the windings 27, 29, 31 and 6 on the cores $C_1$, $C_3$, $I_2$ and $C_4$ which does not effect the cores $C_1$, $C_3$ or $C_4$ but resets $I_2$ to the 0 state which in turn induces a voltage on the output winding 11 with the dotted end positive causing a counterclockwise current flow in loop A which fully writes the core $S_1$. The core $S_1$ is subsequently switched back to the 0 state by the $I_B$ clock pulse source which directs a reset signal into the winding 34 of the core $S_1$ and the windings 9 and 33 on the cores $C_3$ and $I_2$, respectively. Resetting the core $S_1$ to the 0 state induces a voltage in the output winding 10 with the dotted end positive which causes a counterclockwise current flow in loop A tending to write the core $C_4$, read the core $C_1$ and write the cores $C_3$ and $I_2$. The cores $C_3$ and $I_2$ are held in the 0 state by their $I_B$ drives, and the core $C_1$, is uneffected since it was previously in the zero state. The current then switches the core $C_4$ from the 0 to the 1 state to induce a voltage in the output winding 17 with the undotted end positive causing a counterclockwise current flow in loop B which writes the core $S_2$. The core $C_4$ is now cleared by the $I_{RB}$ clock pulse source which directs a reset signal into the windings 8, 36, 37 and 38 of the cores $C_3$, $I_2$, $S_1$ and $C_4$, respectively. The core $C_4$ switching from the 1 to the 0 state induces a voltage on the windings 16 and 17 with their dotted end positive causing a counterclockwise current flow in loop A and tending to cause a clockwise current flow in loop B which is blocked and dissipated by the diode $D_2$. The current in loop A tends to read the core $C_1$ and write the cores $C_3$, $I_2$ and $S_1$. The core $C_1$ is uneffected, while the cores $C_3$, $I_2$ and $S_1$ are held in the 0 state by virtue of their $I_{RB}$ drives. Here then, a signal is delivered at the output terminals in the absence of inputs.

Assume now that an input is available into the winding 20 on the core $C_1$ which switches the core toward the 1 state and in so doing induces a voltage on the output winding 15 with the undotted end positive. Coincidently, the $I_A$ clock pulse source directs a write signal into the winding 31 on the core $I_2$ to switch it from the 0 to the 1 state and in so doing induces a voltage on the output winding 11 with the undotted end positive. The algebraic sum of the induced voltages is such as to effectively cancel, and allow negligible current flow in the loop. The same effect is evident when next the $I_{RA}$ clock pulse source resets the cores $C_1$ and $I_2$ by directing a reset signal into the windings 27, 29, 31 and 6 on the cores $C_1$, $C_3$, $I_2$ and $C_4$, respectively, which does not effect the cores $C_3$ or $C_4$, but does switch the cores $C_1$ and $I_2$ from the 1 to the 0 state to induce a voltage on their output windings 15 and 11, respectively, with the dotted ends positive. At the termination of the $I_{RB}$ clock pulse, all cores are left in the 0 remanence state. Since the latter condition exists, and the further application of the $I_B$ and $I_{RB}$ clock pulse sources serve only to direct a reset signal into their associated windings, a signal will not be obtained at the output terminals. Thus an input to the core $C_1$ provides no output from the circuit.

Assume now that an input were available into the winding 22 on the core $C_3$. The core $C_3$ will then switch from the 0 to the 1 state to induce a voltage on the output winding 13 with the undotted end positive. The core $I_2$ switches at the same time to the 1 state by virtue of the $I_A$ clock pulse source which directs a write signal into the winding 24 on the core $I_2$ which switches the core from the 0 to the 1 state and in so doing induce a voltage on the output winding 11 with the undotted end positive. The algebraic sum of the induced voltages tends to cause a clockwise current flow in loop A which is blocked and dissipated by the diode $D_1$. Next, the $I_{RA}$ clock pulse source directs a reset signal into the windings 27, 29, 31 and 6 on the cores $C_1$, $C_3$, $I_2$ and $C_4$, respectively, of which, the cores $C_3$ and $I_2$ are reset to the 0 state to induce a voltage on the windings 13 and 11, respectively, with the dotted end positive. The algebraic sum of the induced voltages causes a counterclockwise current flow which starts switching the core $S_1$ for the 0 to the 1 state. However, since we have available the volt-time product equal to two cores switching, current is available to switch the core $C_4$ to the 1 state. To avoid switching the core $C_4$ to the 1 state at this time, it is held in the 0 state by virtue of the $I_{RA}$ drive. The core $S_1$ is now cleared by the operation of the $I_B$ clock pulse source which applies a reset signal into the windings 9, 33 and 34 on the cores $C_3$, $I_2$ and $S_1$, respectively. The core $S_1$ in resetting to the 0 state induces a voltage on the output winding 10 with the dotted end positive to cause a counterclockwise current flow in loop A which tends to write the core $C_4$, read the core $C_1$ and write the cores $C_3$ and $I_2$. The core $C_1$ is already in the 0 state, while the cores $C_3$ and $I_2$ are held in the 0 state by the $I_B$ drive, to allow switching of the core $C_4$. The core $C_4$ switching to the 1 state induces a voltage on the output winding 17 with the undotted end positive to cause a counterclockwise current flow in loop B which writes the core $S_2$. Subsequently, the $I_{RB}$ clock pulse source directs a reset signal into the windings 8, 36, 37 and 38 on the cores $C_3$, $I_2$, $C_1$ and $C_4$, respectively. The core $C_4$ switches to the 0 state to induce a voltage on the output windings 16 and 17 with their dotted end positive. The induced voltages tend to cause a clockwise current flow in loop B, which is blocked and dissipated by the diode $D_2$, and causes a counterclockwise current flow in loop A which tends to read the core $C_1$ and write the cores $C_3$, $I_2$ and $S_1$. The core $C_1$ is uneffected, while the cores $C_3$, $I_2$ and $S_1$ are held in the 0 state by the $I_{RB}$ drive. Thus, a signal is obtained at the output terminals when an input to a designated core, $C_3$, is present.

Assume now both inputs to the windings 20 and 22 are available. The inputs switch the cores $C_1$ and $C_3$ to the 1 state which in turn induces a voltage on the windings 15 and 13 with their undotted end positive. The $I_A$ clock pulse source, at input time, switches the core $I_2$ to the 1 state by directing a write signal into the winding 24. Switching the core $I_2$ to the 1 state induces a voltage on the output winding 11 with the undotted end positive. The algebraic sum of the induced voltages is such as to tend to cause a clockwise current flow in loop A, which is blocked and dissipated by the diode $D_1$. A reset signal is next directed into the windings 27, 29, 31 and 6 on the cores $C_1$, $C_3$, $I_2$ and $C_4$, respectively, by the $I_{RA}$ clock pulse source. The cores $C_1$, $C_3$ and $I_2$ are switched to the 0 state to induce a voltage on the output windings 15, 13 and 11, respectively, with the dotted end positive. The algebraic sum of the induced voltage is such as to cause a counterclockwise current flow in loop A which writes the core $S_1$. After termination of the pulse from the $I_{RA}$ clock pulse source, the $I_B$ clock pulse source directs a reset signal into the windings 9, 33 and 34 on the cores $C_3$, $I_2$ and $S_1$. The core $S_1$ switches to the 0 state and in so doing induces a voltage on the output winding 10 with the dotted end positive which causes a counterclockwise current to flow in loop A tending to write the core $C_4$, read the core $C_1$ and write the cores $C_3$ and $I_2$. The core $C_1$ is already in the 0 state, while the cores $C_3$ and $I_2$ are held in the 0 state by the $I_B$ drive, to allow the core $C_4$ to switch to the 1 state. The core $C_4$ in switching induces a voltage on the output winding 17 with the undotted end positive causing a counterclockwise current flow in loop B which writes the core $S_2$. The core $C_4$ is then cleared by the subsequent operation of the $I_{RB}$ clock pulse source which directs a reset signal into the windings 8, 36, 37 and 38 on the cores $C_3$, $I_2$, $S_1$ and $C_4$, respectively. The core $C_4$ in switching from the 1 to the 0 state induces a voltage on the windings 16 and 17 with their dotted end positive tending to cause a clockwise current flow in loop B, which is blocked and dissipated by the diode $D_2$, and causing a counterclockwise current flow in loop A which tends to read the core $C_1$ and write the cores $C_3$, $I_2$ and $S_1$. The cores in loop A are uneffected since the core $C_1$ is already in the 0 state, while the cores $C_3$, $I_2$ and $S_1$ are held in the 0 state by the $I_{RB}$ drive. The circuit has thus accomplished the if then function by delivering an output in every instance except when and only when an input was available to the core $C_1$ and there is no input to $C_3$.

Referring again to FIG. 2, assume we now desire to perform the "not both" function. The switches $SW_3$ and $SW_7$ are operated and the equivalent circuit is then as shown in FIG. 7.

Figure 7:
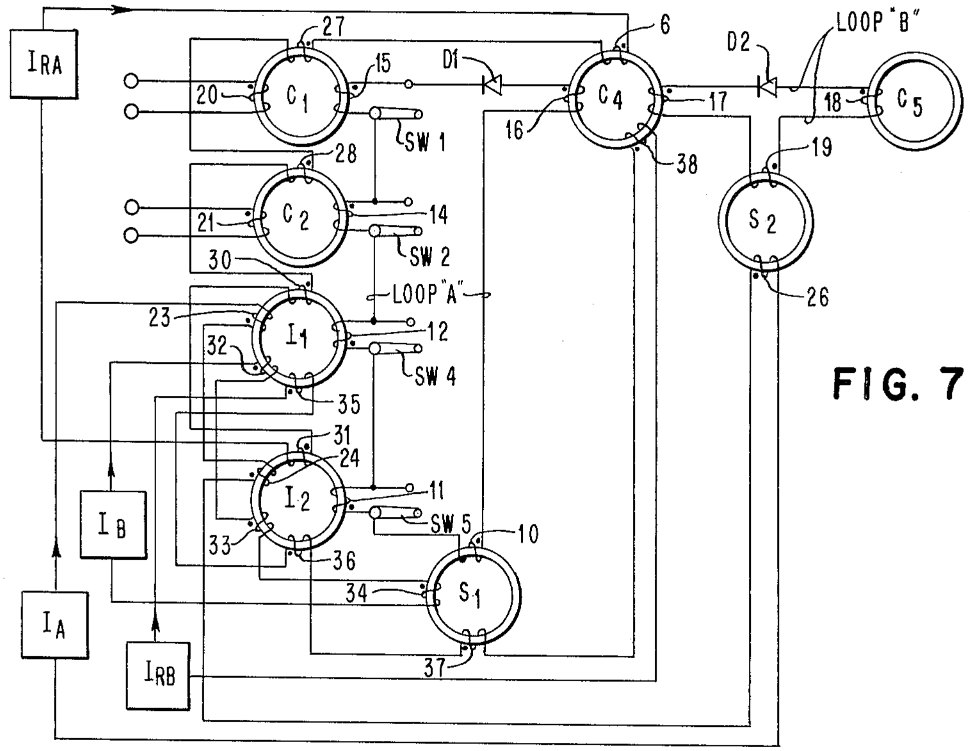
FIG. 7 is another equivalent circuit diagram illustrating the not both circuit of FIG. 2.

Referring to FIG. 7, assume that there is an absence of input signals. Initially, the $I_A$ clock pulse source directs a write signal into the windings 23 and 24 on the cores $I_1$ and $I_2$, respectively. This write signal switches the cores $I_1$ and $I_2$ to the 1 state and in so doing induces a voltage on the output windings 12 and 11 with the undotted end positive tending to cause a clockwise current flow in loop A which is blocked and dissipated by the diode $D_1$. Next, the cores $I_1$ and $I_2$ are cleared by the $I_{RA}$ clock pulse source which directs a reset signal into the windings 27, 28, 30, 31 and 6 on the cores $C_1$, $C_2$, $I_1$, $I_2$, and $C_4$, respectively. the cores $I_1$ and $I_2$ in switching from the 1 to the 0 state induce a voltage on the windings 12 and 11, respectively, with their dotted end positive causing a counterclockwise current to flow in loop A which writes the score $S_1$ and tends to write the core $C_4$ which is held in the 0 state by virtue of the $I_{RA}$ drive. Subsequently, the $I_B$ clock pulse source directs reset signal into the windings 32, 33 and 34 of the cores $I_1$, $I_2$ and $S_1$, respectively, which switches the core $S_1$ to the 0 state to induce a voltage on the output winding 10 with the dotted end positive. This induced voltage causes a counterclockwise current to flow in loop A which tends to write the core $C_4$, read the cores $C_1$ and $C_2$, and write the cores $I_1$ and $I_2$. The cores $C_1$ and $C_2$ are uneffected, while the cores $I_1$ and $I_2$ are held in the 0 state by the $I_B$ drive. The core $C_4$ then switches from the 0 to the 1 state to induce a voltage on the output winding 17 with the undotted end positive to cause a counterclockwise current flow in loop B which writes the core $S_2$. The core $C_4$ is now cleared by the $I_{RB}$ clock pulse source which directs a reset signal into the windings 35, 36, 37 and 38 on the cores $I_1$, $I_2$, $S_1$ and $C_4$, respectively. The core $C_4$, in switching to the 0 state induces a voltage on the winding 16 and 17 with their dotted end positive tending to cause a clockwise current flow in the loop B which is blocked and dissipated by the diode $D_2$ and causing a counterclockwise current flow in loop A which current tends to read the cores $C_1$ and $C_2$ and to write the cores $I_1$, $I_2$ and $S_1$. The cores $C_1$ and $C_2$ are unaffected while the cores $I_1$, $I_2$ and $S_1$ are held in the 0 state by the $I_{RB}$ drive.

Assume now an input is available into the winding 21 on the core $C_2$. The core $C_2$ then switches to the 1 state to induce a voltage on the output winding 14 with the undotted end positive. Coincidently, the cores $I_1$ and $I_2$ are switched to the 1 state by the $I_A$ clock pulse source which directs a write signal into the windings 23 and 24, respectively. The cores $I_1$ and $I_2$ in switching induce a voltage on the output windings 12 and 11, respectively, with the dotted end positive. The algebraic sum of the induced voltages is such as to tend to cause a clockwise current flow in loop A, which is blocked by the diode $D_1$. Next, the $I_{RA}$ clock pulse source directs a reset signal into the windings 27, 28, 30, 31 and 6 on the cores $C_1$, $C_2$, $I_1$, $I_2$ and $C_4$, respectively, to switch the cores $C_2$, $I_1$ and $I_2$ to the 0 state. In switching, the cores $C_2$, $I_1$ and $I_2$ induce a voltage on the output windings 14, 12 and 11, respectively, with the dotted end positive. The algebraic sum of the induced voltages is such as to cause a counterclockwise current to flow in loop A which switches the core $S_1$ to the 1 state. It is then apparent, from the previously described condition of this circuit, that the 1 will be transferred to the core $S_2$ and all other cores reset to 0 upon application of the subsequent $I_B$ and $I_{RB}$ clock pulses. The same result ocurs when an input is directed to the winding 20 of the core $C_1$.

Assume now an input is directed into both the windings 20 and 21 on the cores $C_1$ and $C_2$, respectively. The cores $C_1$ and $C_2$ then switch from the 0 to the 1 state to induce a voltage on the output windings 15 and 14 with their dotted ends positive. At input time, the $I_A$ clock pulse source directs a signal which coincidently writes the cores $I_1$ and $I_2$, as described above, to induce a voltage on the windings 12 and 11 with the undotted end positive. The algebraic sum of the induced voltages is effectively zero and negligible current flows in loop A. After termination of the $I_A$ clock pulse, the $I_{RA}$ clock pulse source now directs a reset signal into the windings 27, 28, 30, 31 and 6 on the cores $C_1$, $C_2$, $I_1$, $I_2$ and $C_4$. The cores $C_1$, $C_2$, $I_1$ and $I_2$ are switched to the 0 state and in so doing induce a voltage on their output windings with the dotted end positive. Again, the algebraic sum of the induced voltage is effectively zero, to allow negligible current flow in the loop A. Since the core $S_1$ was left in the 0 state after application of the input, $I_A$ and $I_{RA}$ signals, the further application of the $I_B$ and $I_{RB}$ clock pulses produces no signal at the output winding 17 of the core $C_4$. Thus a signal is delivered at the output terminals of the circuit in every instance except when both input signals are present.

Figure 8:
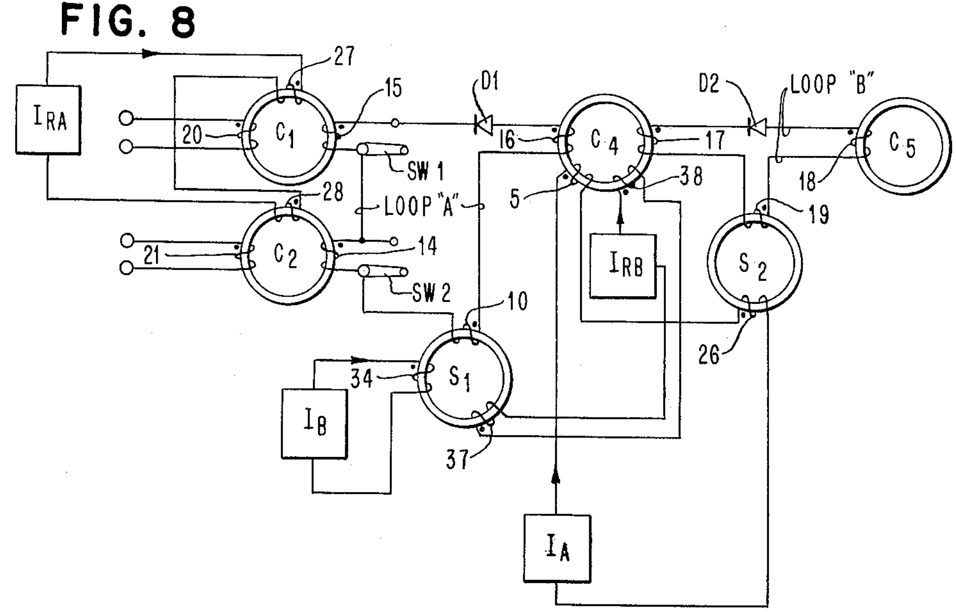
FIG. 8 is still another equivalent circuit diagram illustrating the inclusive or circuit of FIG. 2.

In the FIG. 2, if we desire to perform the function inclusive or, switches $SW_3$, $SW_4$, $SW_5$ and $SW_6$ are operated and the circuit now formed is that shown in FIG. 8.

Referring to FIG. 8, assume there is an absence of inputs. Initially the $I_A$ clock pulse source directs a reset signal into the winding 5 on the core $C_4$ which leaves the core uneffected since it is already in the 0 state. This pulse is also directed to winding 26 of core $S_2$ and produces no resultant effect. Next, the $I_{RA}$ clock pulse source directs a reset signal into the windings 27 and 28 on the cores $C_1$ and $C_2$, respectively, which has no effect since the cores have not been previously switched to the 1 state. The subsequent $I_B$ clock pulse source signal also has no effect on the circuit since it directs a reset signal into the winding 34 of the core $S_1$ which has not been switched to the 1 state. Similarly, $I_{RB}$ clock pulse source directs a reset signal into the windings 37 and 38 on the cores $S_1$ and $C_4$, respectively, which again has no effect.

Assume now an input is available to switch the core $C_1$. The core $C_1$ in switching from the 0 to the 1 state induces a voltage on the output winding 15 with the undotted end positive causing a counterclockwise current flow in the loop A. This counterclockwise current flow is directed into the undotted end of the winding 10 of the core $S_1$, and therefore switches the core $S_1$ to the 1 state. Next, the $I_{RA}$ clock pulse source directs a reset signal into the windings 27 and 28 on the cores $C_1$ and $C_2$, respectively, to switch the core $C_1$ from the 1 to the 0 state, and in so doing to induce a voltage on the output winding 15 with the dotted end positive. This induced voltage tends to cause a clockwise current flow in loop A, which is blocked and its energy dissipated by the diode $D_1$. The core $S_1$ is subsequently cleared by the $I_B$ clock pulse source which directs a reset signal into the winding 34 to switch the core from the 1 to the 0 state. The core $S_1$ in being reset, induces a voltage on the output winding 10 with the dotted end positive causing a counterclockwise current flow in loop A. This counterclockwise current flow tends to write the core $C_4$, and read the cores $C_1$ and $C_2$. The cores $C_1$ and $C_2$ are unaffected, while the core $C_4$ switches from the 0 to the 1 state and in so doing induces a voltage on the output winding 17 with the undotted end positive causing a counterclockwise current flow in loop B which writes the core $S_2$. Next, the $I_{RB}$ clock pulse source directs a reset signal into the windings 37 and 38 on the cores $S_1$ and $C_4$, respectively, which clears the core $C_4$ to the 0 state to induce a voltage on the windings 16 and 17 with their dotted end positive, which voltage tends to a cause a clockwise current flow in the loop B that is blocked and dissipated by the diode $D_2$, and causes a counterclockwise current flow in the loop A. The counterclockwise current flow in the loop A tends to read the cores $C_1$ and $C_2$, which are already in the 0 state, and tends to write the core $S_1$, which is held in the 0 state by virtue of the $I_{RB}$ drive acting on the winding 37. Thus when a signal is available at one of the input terminals, a signal is delivered at the output terminals.

From the above description, it is observed that if a signal input were available to the core $C_2$, again an output is available at the output terminals.

Assume now that inputs are available which switch both the cores $C_1$ and $C_2$ to the 1 state. The cores $C_1$ and $C_2$ in switching induce a voltage on their output windings 15 and 14, respectively, with the undotted end positive, both voltages being additive, to cause a counterclockwise current flow in the loop A, which current flow tends to write the cores $S_1$ and $C_4$. Coincidently the $I_A$ clock pulse source has directed a reset signal into the winding 5 of the core $C_4$ which holds it in the 0 state, while the core $S_1$ does switch from the 0 to the 1 state. The cores $C_1$ and $C_2$ are subsequently cleared by the $I_{RA}$ clock pulse source which directs a reset signal into the windings 27 and 28, respectively, to switch the cores from the 1 to the 0 state and in so doing induce a voltage on the output windings 15 and 14 with their dotted end positive. The induced voltages are additive and tend to cause a clockwise current flow in the loop A which is blocked by the diode $D_1$. Next, the $I_B$ clock pulse source directs a reset signal into the winding 34 on the core $S_1$ which switches the core from the 1 to the 0 state and in so doing induces a voltage on the output winding 11 with the dotted end positive, causing a counterclockwise current flow in loop A which writes the core $C_4$. The core $C_4$ in switching from the 0 to the 1 state, induces a voltage on the output winding 17 with the undotted end positive causing a counterclockwise current flow in the loop B which writes the core $S_2$. After the $I_B$ clock pulse terminates, the $I_{RB}$ clock pulse source now directs a reset signal into the windings 37 and 38 on the cores $S_1$ and $C_4$, respectively. The core $C_4$ switches from the 1 to the 0 state and in so doing induces a voltage on the windings 16 and 17 with their dotted end positive. These induced voltages tend to cause a clockwise current flow in loop B which is blocked by the diode $D_2$ and a counterclockwise current flow in loop A which tends to read the cores $C_1$ and $C_2$, which are already in the 0 state, and to write the core $S_1$. The core $S_1$, however, is held in the 0 state by virtue of the $I_{RB}$ drive. Thus a signal is obtained at the output terminals in every instance when there is any one or both input signals directed to the input terminals of the circuit.

Figure 9:
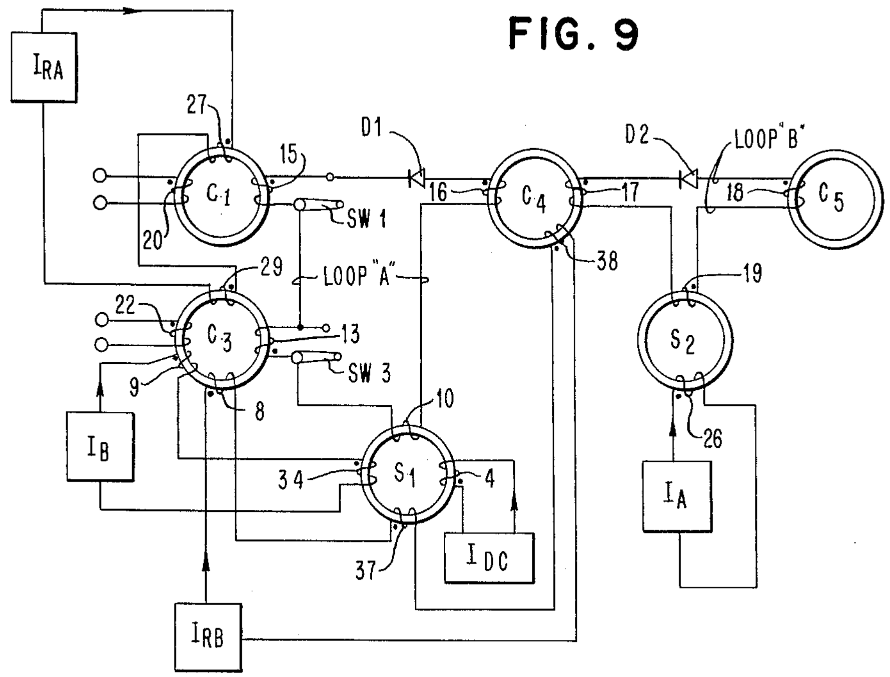
FIG. 9 is yet another equivalent circuit diagram illustrating the exclusive or circuit of FIG. 2.

In the FIG. 2, if we desire to perform the function exclusive or, switches $SW_2$, $SW_4$, $SW_5$, $SW_6$, $SW_7$ and $SW_8$ are operated and the circuit now formed is effectively that shown in FIG. 9.

Referring then to FIG. 9, assume initially, an absence of inputs. The $I_{RA}$ clock pulse source directs a reset signal into the windings 27 and 29 on the cores $C_1$ and $C_3$, respectively, which has no effect since both cores have not been previously switched to the 1 state. Similarly, the $I_B$ clock pulse source next directs a reset signal into the winding 34 on the core $S_1$ and winding 9 of core $C_3$ with no effect. Subsequently, the $I_{RB}$ clock pulse source directs a reset signal into the windings 8, 37 and 38 on the cores $C_3$, $S_1$ and $C_4$, respectively, which signal has no effect again, since all cores were previously left in the 0 state.

Assume an input is directed into the winding 22 on the core $C_3$, which switches the core from the 0 to the 1 state. The core $C_3$ in switching to the 1 state, induces a voltage on the output winding 10 with the dotted end positive tending to cause a clockwise current flow in the loop A which is blocked by the diode $D_1$. The core $C_3$ is now cleared to the 0 state by the $I_{RA}$ clock pulse source which directs a reset signal into the windings 27 and 29 on the cores $C_1$ and $C_3$, respectively. The core $C_3$ in resetting induces a voltage on the output winding 13 with the dotted end positive causing a counterclockwise current flow in the loop A which is directed into the undotted end of the winding 10 on the core $S_1$ which current writes the core $S_1$. The subsequent $I_B$ clock pulse source directs a reset signal into the windings 9 and 34 on the cores $C_3$ and $S_1$, respectively, which switches the core $S_1$ from the 1 to the 0 state and in so doing induces a voltage on the input winding 10 with the dotted end positive. This induced voltage causes a counterclockwise current flow in loop A which tends to write the core $C_4$, read the core $C_1$ and write the core $C_3$. The core $C_1$ is already in the 0 state, while the core $C_3$ is held in the 0 state by virtue of the $I_B$ drive on its winding 9. The core $C_4$ is therefore switched to the 1 state and in so doing induces a voltage on the output winding 17 with the undotted end positive causing a counterclockwise current flow in the loop B which current writes the core $S_2$. Upon termination of the $I_B$ clock pulse, the $I_{RB}$ clock pulse source directs a reset signal into the windings 8, 37 and 38 on the cores $C_3$, $S_1$ and $C_4$. The core $C_4$ is reset to the 0 state which induces a voltage on the windings 16 and 17 with their dotted end positive. The induced voltage on winding 17 is such as to tend to cause a clockwise current flow in the loop B which is blocked by the diode $D_2$. The induced voltage on the winding 16 is such as to cause a counterclockwise current flow in the loop A tending to read the core $C_1$ and write the cores $C_3$ and $S_1$. Since the core $C_1$ is already in the 0 state, it is uneffected, while the cores $C_3$ and $S_1$ are held in the 0 state by their $I_{RB}$ drives. Thus, for an input to one of the input terminals, a signal is obtained at the output terminals.

Assume now that a signal input is directed into the winding 20 on the core $C_1$. The core $C_1$ switches to the 1 state and in so doing induces a voltage on the output winding 15 with the undotted end positive causing a counterclockwise current flow in the loop A. This current flow in loop A tends to write the cores $C_3$, $S_1$ and $C_4$. It is noted that the turns ratio of the winding 13 is greater than the turns ratio of the winding 10 on the core $S_1$ which is in turn greater than the turns ratio of the winding 16 on the core $C_4$. Since a greater number of ampere turns is developed by the winding 13 which would normally cause the core $C_3$ to switch preferentially, to avoid this action, the previous operation of the switch $SW_8$ applied a D.C. write bias to the winding 4 on the core $S_1$ to insure the core $S_1$ preferentially switching to the 1 state and in so doing absorbing most of the available volt-time product. At the termination of the input signal, the cores $C_1$ and $S_1$ are left in the 1 remanence state. The $I_{RB}$ clock pulse source next directs a reset signal into the windings 27 and 29 on the cores $C_1$ and $C_3$, respectively, to reset the core $C_1$ to the 0 state. The core $C_1$ in switching to the 0 state induces a voltage on the output winding 15 with the dotted end positive tending to cause a clockwise current flow in the loop A, which is blocked by the diode $D_1$. Subsequent operation of the $I_B$ and $I_{RB}$ clock pulses clears the core $S_1$ which transfers the information stored to the core $S_2$ and clears the cores associated with the loop A.

Assume now that an input signal is directed into the windings 20 and 22 on the cores $C_1$ and $C_3$, respectively. Both the cores $C_1$ and $C_3$ switch to the 1 state and in so doing induce a voltage on the output windings 15 and 13, respectively, with the undotted end positive. The algebraic sum of the induced voltages again effectively cancel and allow negligible current flow in the loop A. At the termination of the $I_{RA}$ clock pulse, all cores are left in the 0 remanence state. The subsequent operation of the $I_B$ and $I_{RA}$ clock pulse sources are then similar to the initial condition previously described for the absence of inputs to the circuit, to further provide no transfer of information. Thus, the function of exclusive or has been accomplished.

In all the instances described above in detail, operation of the circuit of FIG. 2 has been considered by operating the various switches, wherein binary logic was performed. The circuit of FIG. 2, however, is also capable of performing a logical operation on the three input variables to the input windings 20, 21 and 22. Such a logical operation falls within the class of ternary logic, wherein three input variables may be simultaneously applied to a circuit which provides an output indication manifesting a particular logical operation. In this circuit, the element of non-commutivity is employed, in that the device has the ability to provide an output dependent not merely upon the number of information variable signals present, but of a particular one of the information variables.

From the aforegoing description of the various circuit arrangements provided by the operation of the switches, it is clearly understood that if, during the operation of the $I_A$ and $I_{RA}$ clock pulse sources the core $S_1$ is switched from the 0 to the 1 state, an output is provided from the circuit of loop A into the core $S_2$ of loop B through the core $C_4$ during operation of the $I_B$ clock pulse source which reads out and resets the core $S_1$ to the 0 state by energizing its winding 34. Thereafter, the core $C_4$ is reset by the $I_{RB}$ clock pulse source readying the circuit of loop A for the next cycle of operation.

In view of the above, we may consider operation of the circuit of FIG. 2, with all the switches in their normally rest position, during the operation of the $I_A$ and $I_{RA}$ clock pulse sources to determine if a signal is available to switch the core $S_1$ to the 1 state and thereby provide an output signal from the circuit of loop A. For ease of presentation, a truth table is shown below wherein each column refers to a particular core and a 0 notation is employed to designate the absence of input signal to the core and a 1 notation to designate the presence of input signal.

| $C_1$ | $C_2$ | $C_3$ | $S_1$ |
|---|---|---|---|
| 1 | 1 | 1 | 1 |
| 0 | 1 | 1 | 1 |
| 1 | 0 | 1 | 1 |
| 0 | 0 | 1 | 1 |
| 1 | 1 | 0 | 0 |
| 0 | 1 | 0 | 1 |
| 1 | 0 | 0 | 1 |
| 0 | 0 | 0 | 1 |

The above truth table is readily perceived by considering the bucking effect of the cores $I_1$, and $I_2$ which are switched to the 1 state during operation of the $I_A$ clock pulse source and the bucking effect of the core $C_3$ when switched by an input signal, coupled with the fact that switching of the core $S_1$ takes place, if at all, upon operation of the $I_{RA}$ clock pulse source. An output signal is always available from the circuit of FIG. 2 except when both the cores $C_1$ and $C_2$ are provided with inputs and the core $C_3$ is not. In this particular case, the circuit of FIG. 2 may be said to operate similar to the circuit operation of FIG. 7 when both inputs to the cores $C_1$ and $C_2$ are available.

To further clarify the circuit presented, assume that in all instances described above, the switches $SW_6$ and $SW_7$ were not operated as depicted and described. The winding 5 on the core $C_4$ serves to hold the core in the 0 state upon application of a signal from the $I_A$ clock pulse source and similarly the winding 6 on the core $C_4$ serves to hold the core $C_4$ in the 0 state upon application of a signal from the $I_{RA}$ clock pulse source. It may then be observed, that operation of the functional circuits would then be the same, since in all cases where the switches $SW_6$ and $SW_7$ were operated to disconnect their associated winding from the circuit, the core $C_4$ was left in the 0 state upon termination of the $I_A$ clock pulse source and the $I_{RB}$ clock pulse source.

From the above descriptions, it is apparent that input coupling core $C_3$ is very similar to either of the inhibit cores $I_1$ and $I_2$ in the number and arrangement of its windings and in operation. The only exception is that $I_1$ and $I_2$ are invariably written into by the $I_A$ pulse through windings 23 and 24, while $C_3$ is written into during the $I_A$ pulse period only in the presence of an input signal to its input winding 22. Core $C_3$ then performs in a manner substantially identical to $I_1$ or $I_2$ in its effect within loop A. That is, it bucks $C_1$ or $C_2$. Thus, $C_3$ may be referred to as an inhibit core because it performs an inhibit action with respect to $C_1$ and $C_2$ similar to the inhibit cores $I_1$ and $I_2$ when it receives an input signal. To define these characteristics, the following terminology is sometimes used below: $C_1$ and $C_2$ are referred to as direct input cores, and $I_1$, $I_2$, and $C_3$ are referred to as inverter cores, $C_3$ also being referred to as an input inverter core.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A binary information circuit comprising a magnetic storage core capable of retaining alternate stable residual magnetic states in representing binary information; control winding means on said storage core; a first, a second, a third and a fourth coupling core; input and output winding means on each of said coupling cores; an inhibit core; output winding means on said inhibit core; circuit means including an asymmetrical impedance device connecting the output winding means on said first, second and third coupling core and said inhibit core, said control winding means and said input winding means on said fourth coupling core; all in series with said output winding means of said first and second coupling cores being connected in opposition to said output winding means of said third coupling core and said inhibit core; shift winding means on each of said coupling cores and said inhibt core adapted to be energzed simultaneously and to drive each of said coupling cores and said inhibit core toward a datum residual state; additional shift winding means on said third coupling core, said inhibit core and said storage core adapted to be energized simultaneously and to drive said third coupling core, said inhibit core and said storage core toward the datum residual state; further shift winding means on said third coupling core, said inhibit core, said storage core and said fourth coupling core adapted to be energized simultaneously and to drive said third and fourth coupling core, said inhibit core and said storage core toward the datum residual state; a third shift winding means on said inhibit core adapted to drive said inhibit core toward the opposite residual state when energized, and switching means operably connected across the output windings on said first, second and third coupling cores and said inhibit core said switching means being effective when selectively operated to control the response of said circuit to said information whereby a selective one of a plurality of switching operations is performed.

2. A circuit as described in claim 1 wherein said switching means is operable to short out said output winding means on said second and third coupling cores and to disconnect said shift winding means from said fourth coupling core, controlling said circuit to perform the logical function of inversion.

3. A circuit as described in claim 1 wherein said switching means is operable to short out said output winding means on said third coupling core and to disconnect said shift winding means from said fourth coupling core, controlling said circuit to perform the logical function of equals.

4. A circuit as described in claim 1 wherein said switching means is operable to short out said output winding means on said second coupling core, controlling said circuit to perform the logical function of if then.

5. A circuit as described in claim 1 wherein said switching means is operable to short out said output winding means on said second coupling core and said inhibit core, and to disconnect said shift winding means from said fourth coupling core controlling said circuit to perform the logical function of exclusive or.

6. A core logic apparatus comprising a plurality of a direct input cores and inverter cores and a storage core, said direct input and inverter cores each having an output winding and said storage core having a control winding, all of said windings being connected in series in a circuit including an asymmetrical impedance device, said direct input and inverter cores each having a write winding and each being operable during a first pulse period if a write signal is received therein to change from a first stable magnetic state to a second stable magnetic state, reset windings on each of said direct input and inverted cores operable during a second pulse period on any of said cores which are in a second stable state to reset said cores to said first stable state, said output windings of said direct input and inverter cores being connected in opposition in said series circuit such that the voltages induced therein during said changes in state are in opposition to one another so as to cancel when the number of said direct input and said inverter cores changing state is equal, the difference in said induced voltages being sufficient to change said storage core from a first stable magnetic state to a second stable magnetic state when the number of said direct input and inverter cores changing state is unequal during the one of said pulse periods when said difference voltage has a polarity to set up a current in the direction of minimum impedance of said asymmetrical device, said difference voltage being insufficient to change the state of said storage core during the other one of said pulse periods when said difference voltage is in the direction of maximum impedance of said asymmetrical device.

7. A magnetic core logic apparatus in accordance with claim 6 in which the write winding of at least one direct input core is arranged to receive a write signal only in response to a logical input signal, and the write winding of at least one inverter core is always provided with a write pulse independent of any logical input pulse during said first pulse period.

8. A magnetic core logic apparatus comprising a plurality of direct input cores and a plurality of inverter cores and a storage core, said direct input and inverter cores each having an output winding and said storage core having a control winding, all of said windings being connected in series relationship in a circuit including an asymmetrical impedance device, said direct input and inverter cores each having a write winding and each being operable during a first pulse period when a write signal is received therein to change from a datum stable magnetic state to an information representative stable magnetic state, said output windings of said direct input and inverter cores being connected in opposition in said series circuit to induce voltages therein during said changes in state tending to set up currents respectively in the directions of minimum and maximum impedance of said asymmetric impedance device, reset windings on each of said direct input and inverter cores operable during a second pulse period on any of said cores which are in an information stable state to reset said cores to a datum stable state, the voltages induced during said second pulse period by a change in state in said direct input and inverter cores being such as to set up currents respectively in the directions of maximum and minimum impedance of said asymmetric impedance device, the induced voltage from each core being of substantially equal value so as to substantially cancel when the number of such voltages present in response to a change of state in said direct input and in said inverter cores is equal during either pulse period, the induced voltage from each core being sufficient to change said storage core from a datum stable state to an information representative stable state when the number of said direct input and inverter cores changing state is unequal and when the resultant difference voltage is in the direction of minimum impedance of said asymmetric device, said difference voltage being insufficient to change the state of said storage core when in the direction of maximum impedance of said asymmetric device.

9. An apparatus in accordance with claim 8 in which said storage core includes a reset winding operable for the resetting thereof during a third pulse period to produce an output pulse in said series circuit, each said inverter core including a second reset winding connected and arranged for operation during said third pulse period to prevent a change of magnetic state therein.

10. A magnetic core logic apparatus in accordance with claim 6 in which the write windings of at least one direct input core and at least one inverter core are arranged to receive a write signal only in response to logical input signals.

No references cited.

IRVING L. SRAGOW, *Primary Examiner.*